United States Patent [19]

Adler

[11] Patent Number: 4,746,914

[45] Date of Patent: * May 24, 1988

[54] CATHODE RAY TUBE FOR USE IN A TOUCH PANEL DISPLAY SYSTEM

[75] Inventor: Robert Adler, Northfield, Ill.

[73] Assignee: Zenith Electronics Corporation, Glenview, Ill.

[*] Notice: The portion of the term of this patent subsequent to Oct. 13, 2004 has been disclaimed.

[21] Appl. No.: 741,975

[22] Filed: Jun. 6, 1985

Related U.S. Application Data

[63] Continuation-in-part of Ser. No. 698,306, Feb. 5, 1985, Pat. No. 4,750,176.

[51] Int. Cl.⁴ .............................................. G09G 1/00
[52] U.S. Cl. ................................ 340/712; 340/365 A; 178/18; 333/153
[58] Field of Search .................. 340/712, 711, 365 A, 340/365 P, 365 R, 349 AD; 178/18, 19; 250/221, 230, 231; 310/313 B, 313 R; 333/151, 195, 153

[56] References Cited

U.S. PATENT DOCUMENTS

| | | | |
|---|---|---|---|
| 3,883,831 | 5/1975 | Williamson et al. | 333/153 |
| 3,916,099 | 10/1975 | Hlady | 178/18 |
| 4,206,426 | 6/1980 | Solie et al. | 333/153 |
| 4,309,679 | 1/1982 | Furuya et al. | 333/153 |
| 4,317,005 | 2/1982 | de Bruyne | 178/18 |
| 4,403,165 | 9/1983 | Ballato et al. | 310/313 B |
| 4,477,784 | 10/1984 | Maerfeld et al. | 333/153 |
| 4,484,160 | 11/1984 | Riha | 333/153 |
| 4,488,000 | 12/1984 | Glenn | 178/18 |
| 4,524,348 | 6/1985 | Lefkowitz | 178/18 |
| 4,558,313 | 12/1985 | Garwin et al. | 340/365 P |
| 4,564,928 | 1/1986 | Glenn et al. | 178/18 |

FOREIGN PATENT DOCUMENTS

0110330 8/1980 Japan .................. 340/712

OTHER PUBLICATIONS

G. W. Judd and J. L. Thoss—"Use of Apodized Metal Gratings in Fabricating Low Cost Quartz RAC Filters'—IEEE 1980 Ultrasonics Symposium, p. 343.
J. Fajans—"Acoustical Touch Panel"—IBM Technical Disclosure Bulletin—vol. 26, No. 7, Dec. 1977—p. 2925.

Primary Examiner—John W. Caldwell, Sr.
Assistant Examiner—Mahmoud Fatahi-yar

[57] ABSTRACT

A cathode ray tube for use in a touch panel system that is capable of recognizing touch positions along a coordinate axis of a touch display surface of the system has a flat glass faceplate capable of propegating surface acoustic waves. An input surface wave transducer, acoustically coupled to the touch display surface, serves to launch a burst of surface waves on that surface. At least one array of wave reflective elements are disposed in or on the touch display surface for directing the surface waves derived from the input trasnducer across the touch display surface.

14 Claims, 4 Drawing Sheets

CATHODE RAY TUBE FOR USE IN A TOUCH PANEL DISPLAY SYSTEM

CROSS-REFERENCE TO RELATED APPLICATION

This application is a continuation-in-part of copending application Ser. No. 698,306, filed Feb. 5, 1985, now U.S. Pat. No. 4,700,176 in the name of Robert Adler and is related to but is not dependent upon copending application Ser. No. 715,134 filed Mar. 22, 1985 in the names of Michael C. Brenner and James J. Fitzgibbon.

BACKGROUND OF THE INVENTION

This invention relates, in general, to a cathode ray tube (CRT) for use in a touch panel display system and, in particular, to a novel CRT arrangement capable of propagating surface acoustic waves across the faceplate of the CRT and directing them along assigned paths of different lengths.

A CRT of the type herein considered is commonly employed as a graphics display device and preferably comprises one having a flat faceplate.

By way of background, in a typical prior art touch control system utilizing a CRT type graphics display device, each of two adjacent edges of the CRT's display surface (faceplate) is provided with a bank of light sources arranged to develop a cluster of parallel light paths which extend across the faceplate, the clusters intersecting, preferably at right angles, to form a grid-type pattern of light paths overlying the display surface. Like banks of light detectors flank those sides of the faceplate opposite the banks of light sources.

In practice, a particular graphic is delivered for display upon the CRT faceplate by a controller in response to an operator's command, which command can take the form of a touching of one area of the faceplate. This touching serves to interrupt one or more of the light beams, which interruption causes the beam's assigned light detector to develop a signal which is applied to the controller to select a particular graphic. U.S. Pat. No. 3,775,560, for example, exemplifies this type of control for a graphics display device. A touch control arrangement of the type adverted to above tends to be rather costly since a separate light sensor is employed for each light source.

It is known to use surface acoustic wave (SAW) energy for touch control. Prior art U.S. Pat. No. 3,134,099-Woo teaches an arrangement in which a plurality of piezoelectric transducers, electrically connected in parallel, is disposed along each of two adjacent edges of a sheet of glass. The transducers are coupled to the sheet and, in response to a control signal, create surface waves which propagate across the surface of the glass sheet. A writing pen, embodying a piezoelectric component, is placed in contact with the glass sheet to sense a propagating disturbance and then issue an appropriate signal to a control unit which measures the elapsed time interval between the time the control signal was applied to the transducer that initiated the disturbance and the time the signal was received by the pen. It is of significance that, in the Woo arrangement, a plurality of piezoelectric transducers is required for each of two adjacent sides of the glass panel. Further, the Woo system requires the use of a special touch stylus capable of sensing surface acoustic waves traveling across the panel.

U.S. Pat. No. 3,653,031-Hlady, et al is addressed to a touch sensitive position encoder also employing elastic surface wave generating transducers positioned along the edges of a sheet of transparent glass. The transducers function as radiators, as well as sensors, and thus serve to launch surface waves across the glass sheet, as well as to receive such waves. In operation, a finger or stylus placed at a particular position on the glass sheet serves to reflect the surface waves encountered. A reflected wave that is detected is applied to timing circuitry associated with the sensors, which circuitry determines the geometric coordinates of the position of the finger or stylus. Again, as in Woo, two arrays, or banks, of transducers are required to create the surface waves that propagate across the glass sheet.

U.S. Pat. No. 3,673,327-Johnson, et al describes still another SAW-type touch responsive panel assembly comprising a panel positioned over the faceplate of a CRT and having a first plurality of transmitters positioned along a first edge of the panel for generating a like plurality of Rayleigh (surface) beams that propagate across the surface of the panel in an X direction and a like plurality of detectors positioned along the edge of the panel opposite said first edge for individually receiving an assigned one of said plurality of beams. In like fashion, a second plurality of transmitters is positioned along a second edge of the panel, adjacent the first edge, for simultaneously generating a second plurality of Rayleigh wave beams that propagate across the panel in a Y direction, perpendicular to the X direction. A like second plurality of detectors is positioned along the edge of the panel opposite said second edge for receiving an assigned one of said second plurality of beams. Accordingly, to establish this X-Y grid of wave beams, a transmitter is required for each wave beam and a separate detector is required for each such transmitter.

Each transmitter, upon actuation, launches a beam of Rayleigh surface waves along the surface of the panel. Thereafter, when a finger or other object is pressed against the panel, acoustical wave energy is absorbed, thereby interrupting its transmission to its assigned detector. The absence or reduction of the normal signal at a specific detector constitutes a touch indication which is applied to a computer.

However, a principal drawback of the Johnson et al touch control system, like that of its optical counterpart, resides in the requirement of a multiplicity of transmitters and detectors to establish the intersecting wave energy paths that form the grid overlying the panel. The mechanical considerations, and cost, involved in the practice of utilizing dual pluralities of transmitters and detectors, all of which must be separately wired, are obvious shortcomings.

Other patents in the touch control art are set forth below:

U.S. Pat. No. 3,775,560
U.S. Pat. No. 3,808,364
U.S. Pat. No. 3,916,099
U.S. Pat. No. 3,956,745
U.S. Pat. No. 4,198,623
U.S. Pat. No. 4,254,333
U.S. Pat. No. 4,286,289
U.S. Pat. No. 4,346,376

Additionally, art in the field of surface acoustic waves which was considered included:

U.S. Pat. No. 3,883,831
U.S. Pat. No. 4,403,165

"Use of Apodized Metal Gratings in Fabricating Low Cost Quartz RAC Filters" by G. W. Judd and J. L. Thoss. Proceedings of the IEEE 1980 Ultrasonics Symposium, p. 343.

OBJECTS OF THE INVENTION

It is therefore a general object of the invention to provide a novel cathode ray tube apparatus for use in a touch panel display system.

It is another object of the invention to provide a novel cathode ray tube capable of sustaining and directing surface acoustic wave propagation across its faceplate.

It is a specific object of the invention to provide a novel cathode ray tube apparatus for use with a touch panel display system which is capable of recognizing touch positions along predetermined coordinate axes on the faceplate of the CRT.

BRIEF DESCRIPTION OF THE DRAWINGS

The features of the present invention believed to be novel are set forth with particularlity in the appended claims. The invention together with further objects and advantages thereof, may best be understood by reference to the following description taken in conjunction with the accompanying drawings, in the several figures of which like reference numerals identify like elements, and in which:

The present invention pertains to a novel cathode ray tube (CRT) construction 10, FIG. 1, which finds particular application for use with a touch panel display system 12 having a control arrangement 14, subsequently to be described in connection with FIG. 10, which is capable of recognizing touch positions along a predetermined coordinate axis on a display surface of the system. The system adverted to is of the type described and claimed in copending application Ser. No. 715,134 filed Mar. 22, 1985 in the names of Michael Brenner and James Fitzgibbon. Accordingly, as much of the Brenner et al disclosure that establishes background for the present invention will be presented hereinafter.

Figure 1:
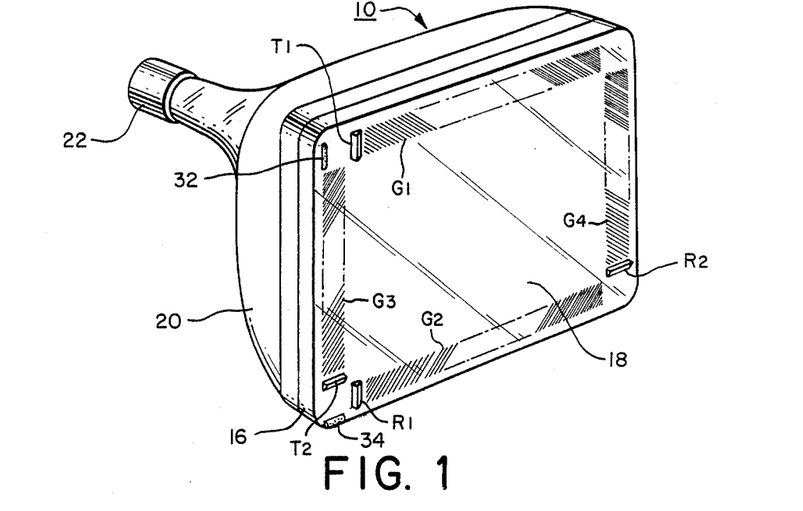
FIG. 1 is a perspective view of a cathode ray tube embodying the invention.

As shown in FIG. 1, CRT 10 comprises a transparent flat glass faceplate 16 having a touch display surface 18 that constitutes a substrate capable of propagating surface acoustic waves and is so characterized that a touch on that surface causes a perturbation of a surface wave propagating through the region of the touch. CRT 10 further comprises a funnel 20 the forward end of which is frit sealed to faceplate 16. The distal end of the funnel terminates in a neck section 22 which encloses an electron gun structure.

Faceplate 16 is commonly designated a "touch control panel" since graphics, or other information may be ordered up for display from controller 14 in response to an operator's command which can take the form of a touching of a particular area of a menu, or directory, exhibited upon display surface 18 of the faceplate. As will be described below, the act of touching surface 18 causes a perturbation of a surface acoustic wave propagating through the region of the touch. In practice, in an X-Y execution of the system, the perturbation is manifested as an interruption or reduction of the wave energy directed along one or more paths that form a grid overlying display surface 18. Moreover, in a manner fully described below, the pressure applied to the panel during the act of touching is utilized to produce a control effect. Detection and analysis of such a perturbation serves to identify the X, Y, or other coordinates in the touched area, which information, in turn, is determinative of an output from controller 14, which can be graphics delivered up for display or some other response. Additionally, the touch pressure employed to induce the perturbation is subjected to an analysis that can produce an additional control effect.

To this end, the controller 14 for touch panel control system 12, which is detailed in FIG. 10 and fully described below, includes a computer 22 for rendering associated circuitry operative in a predetermined sequence so that when a touch-induced perturbation of acoustic wave energy is detected, converted to an electrical signal and fed back to the computer, the location of the touch, as well as the touch pressure employed to induce the perturbation, are identifiable by the computer and converted to control signals containing information indicative of touch location and touch pressure. As will be shown, these signals are applied to a controlled device 23, which can be the CRT 10 adverted to above.

Figure 2:
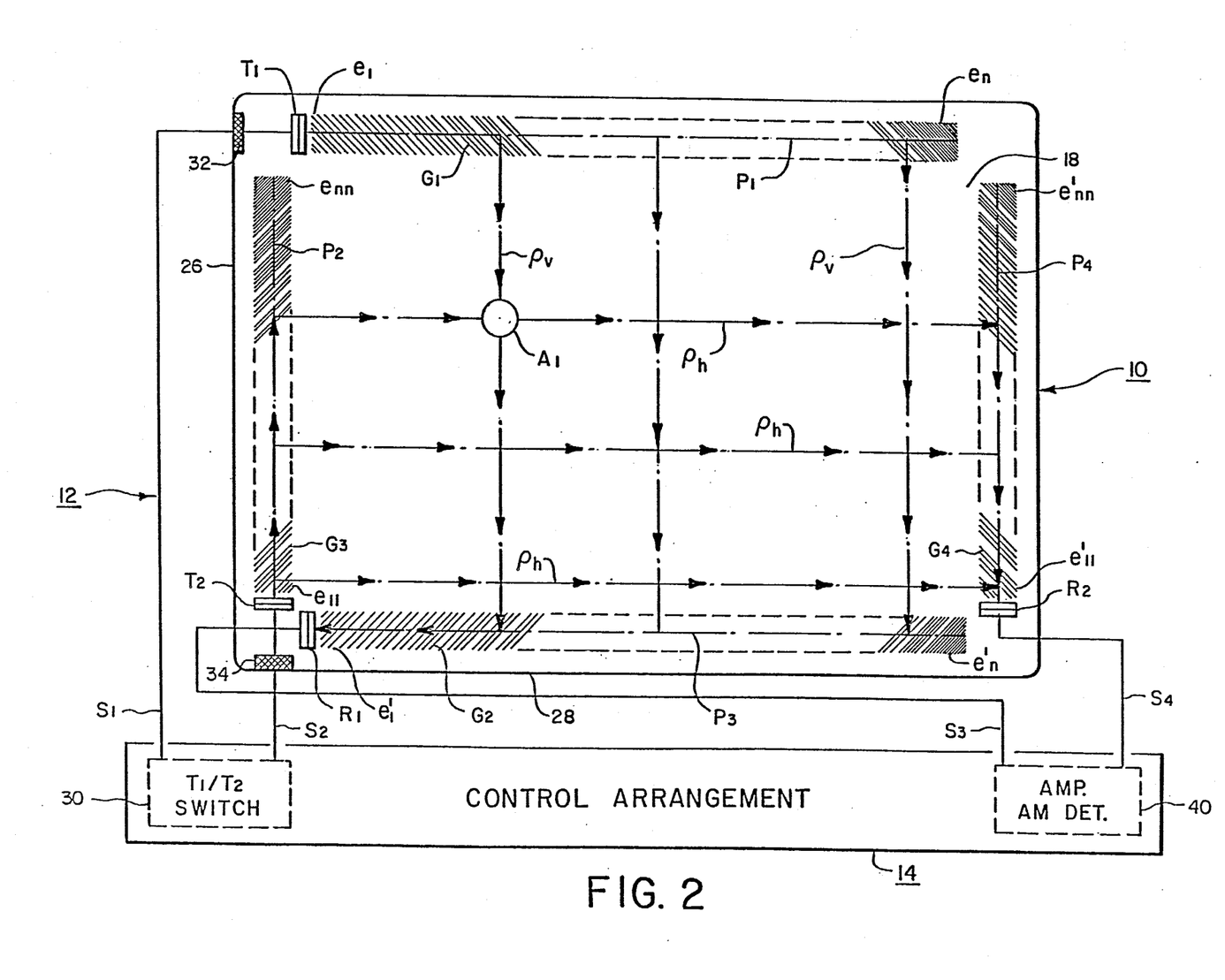
FIG. 2 is a front view of the FIG. 1 cathode ray tube depicting, in some detail, the touch display surface formed on the faceplate of the tube.

As more clearly shown in FIG. 2, surface 18 of faceplate 16 supports a first pair of input and output surface wave transducer means T1, R1, respectively, and a second pair of input and output transducer means T2, R2, respectively. Input transducers (transmitters) T1, T2 are mechanically and acoustically coupled to faceplate surface 18 to the end that, when excited, they individually launch respective bursts of surface waves upon surface 18. Output transducers (receivers) R1, R2 are similarly coupled to surface 18 so that, upon receipt of surface wave energy, they issue individual electrical output signals. In a manner to be described below in connection with the explanation of controller 14, transducers T1, T2 are stimulated by firing signals in a timed sequence so that the location of a subsequent perturbation of a surface wave is identifiable. Input transducers T1, T2, which are more particularly described below, are mounted upon faceplate surface 18 adjacent to edges 26 and 28, respectively, see FIG. 2. A source T1/T2 switch 30 associated with controller 14 serves to apply input firing signals S1, S2 to respective transducers T1, T2, which transducers, in response thereto, individually launch a burst of acoustic surface waves along first and second paths P1, P2, respectively on substrate surface 18.

Also as shown in FIG. 2, the output transducers R1, R2, are mounted upon substrate surface 18 adjacent to edge 28. In a manner to be detailed below, transducers R1, R2, upon receipt of surface waves launched by their associated input transducers that experience a touch-induced perturbation will develop respective output signals S3, S4 which, upon analysis, exhibit a first characteristic indicative of the position, or location of the touch on the substrate surface and a second characteristic indicative of the touch pressure.

A first reflective grating G1 comprising an array of wave reflective elements $e_1$–$e_n$ is disposed along path P1 with each of the aforesaid elements effectively arranged, preferably at like angles of incidence to the longitudinal axis of path P1. Desirably, the angles of incidence of the reflective elements, relative to the axis of path P1, are approximately 45 degrees. Additionally, the longitudinal axis of path P1 is preferably disposed parallel to the upper edge of substrate surface 18, as viewed in FIGS. 1 and 2.

Reflective elements $e_1$–$e_n$ serve to extract from the initially launched surface wave burst a multiplicity of wave components and to direct such wave burst components across substrate surface 18 along a like multiplicity of paths $p_v$ each disposed at an angle to the axis of path P1. As best depicted in FIG. 2, these multiplicities of paths are each disposed at 90 degrees to the axis of path P1.

A second reflective grating G2 likewise comprises an array of reflective elements $e_1'$–$e_n'$ which are disposed along path P3 and are effectively arranged at like angles of incidence to the longitudinal axis of path P3 for intercepting the wave components extracted from the wave traversing path P1 and directed across substrate surface 18 along the paths $p_v$. Grating G2 intercepts the wave burst components arriving along paths $p_v$ and redirects them along path P3 toward receiving transducer R1 which converts the wave energy in a received burst to an electrical output signal S3. In a fashion complementary to that of the first reflective grating G1, the elements of grating G2 are disposed at 45 degrees to the longitudinal axis of path P3 to facilitate interception and redirecting of wave components arriving from grating G1.

The above-described transducer pair T1, R1 and gratings G1, G2 serve to establish one portion of a grid of surface wave burst paths $p_v$ which are disposed across substrate surface 16. A second portion of that grid is established by the second pair of transducers T2, R2 and associated gratings G3, G4. In a manner similar to that described above transducer T2, in response to a firing signal S2, launches a burst of acoustic surface waves along the path P2, which path is disposed perpendicular to the previously described paths P1, P3. The third reflective grating G3 comprises an array of reflective elements $e_{11}$–$e_{nn}$ which are disposed along path P2 with the elements effectively arranged at like angles of incidence to the axis of path P2. Grating G3 serves to extract from the surface wave launched by transducer T2 a multiplicity of wave burst components and to direct such wave burst components across substrate surface 18 along a multiplicity of paths $p_h$ each disposed at a 90 degree angle to the axis of path P2.

A fourth reflective grating G4, comprising an array of reflective elements $e'_{11}$–$e'_{nn}$ is disposed along path P4, each element being arranged at a 45 degree angle to the longitudinal axis of path P4. The reflective elements of grating G4 intercept the wave components directed thereto by the elements of grating G3 along paths $p_h$ and redirect these intercepted wave burst components along path P4 to receiving transducer R2.

Since transducers T1, T2 additionally launch surface acoustic waves along paths P1, P2 in directions opposite from their respective adjoining gratings G1, G3, it is desirable to provide means for arresting such oppositely directed wave energy. Accordingly, a pair of absorbers 32, 34 which can be formed of a soft epoxy, are mounted upon the display surface immediately behind respective transducers T1 and T2.

In the manner just described, and as depicted in FIG. 2, display surface 18 is now provided with an overlying grid comprising a multiplicity of intersecting paths of acoustic surface wave bursts which surface waves are confined to predetermined paths, one series $p_h$ being disposed parallel to what may be termed the horizontal or major axis of display surface 18 while a second, intersecting series of paths $p_v$ are disposed parallel to the vertical or minor axis of the display surface. In this fashion intersecting wave energy paths traverse the surface of the display device, forming an invisible grid that overlies display surface 18.

As will now be described, means are coupled to the input transducers T1, T2 for initiating the launching of bursts of surface waves along paths P1, P2. The application of signals S1, S2 to transducers T1, T2 serve to generate and launch across substrate surface 18 elastic (ultrasonic) surface waves having a substantially planar wavefront with uniform amplitude and phase along lines parallel to the initiating transducer. Transducers T1, T2, (as well as R1 and R2) typically, are piezoelectric transducers comprised of a lead zirconate-titanate ceramic mounted upon a prism of lower velocity material, e.g., Lucite, which effects an efficient electromechanical coupling to substrate surface 18.

The generated surface waves launched along paths P1, P2 are eventually received by transducers R1, R2, respectively, and converted to electrical signals S3, S4. Means including an amplifier and AM detector 40, see FIG. 2, is coupled to the outputs of receiving transducers R1, R2 for determining, by an analysis based on the transit time of the perturbed surface wave burst, which of paths $p_h$, $p_v$ the touch-perturbed wave traversed and thereby establish the location of the touch along two coordinates of substrate 18. In a one coordinate system, for example, in order to identify the X coordinate for the location of the path of a perturbed wave burst along the horizontal axis, as viewed in FIG. 2, the determining means is arranged to make a time analysis of the surface wave burst received by transducer R1. To this end, the determining means analysis commences at the instant input signal S1 is applied to transducer T1 to launch a surface wave. On the time scale of FIG. 3 there is plotted the earliest time an acoustic wave burst from transmitter T1 could arrive at receiver R1.

Assuming that the dimensions of the grid formed by gratings G1, G2 overlying substrate surface 18 are approximately 8"×11", and assuming further that the transit time required for a surface wave burst to travel from T1 to the first reflective element $e_1$ on path P1 is approximately 2 microseconds, as is the transit time required for the surface wave burst to travel to receiver R1 from element $e'_1$, to this is added the transit time of the surface wave from reflective element $e_1$ across the display surface 18 to element $e_n$, which is approximately 64 microseconds. Accordingly, the control system 14 will ignore any disturbance arriving within the first 68 microseconds immediately following the triggering of transmitter T1. Assuming for the moment, that no disturbance or perturbation of the initial surface wave launched by T1 is eperienced, the output of transducer R2 might exhibit the solid line response shown in FIG. 3. Depicted therein is a waveform having a relatively constant amplitude extending for approximately 176 microseconds. This response is established by virtue of the fact that, for a period commencing at $t_o$, surface wave energy is continually received by the detector R1 for 176 microseconds, that is, until time $t_n$. The 176 microsecond interval is the approximate time required for a surface wave to traverse the entire length of reflective grating G1 and return along the length of reflective grating G2. In the absence of a perturbation, the output of receiver transducer R2, when analyzed by control system 14, will supply a signal to its computer 22 which is indicative of the fact that an uninterrupted burst of surface waves traversed substrate surface 16 without interference. The computer relays this information to controlled device 23 (CRT 10) which, in turn, maintains the pre-existing condition on the display surface 18 undisturbed.

Assuming now that an operator wished to select a graphic other than that being displayed, a menu, such as a chart or other type of directory, would indicate which particular area of substrate surface 18, should be touched to call up the desired graphic. Accordingly, assuming that the particular area is that designated A1 in FIG. 2, the operator then inserts his finger into the grid of intersecting surface waves by touching the display surface at A1, which action causes a portion of the acoustic surface wave energy traversing the touched area to be absorbed. This act of touching is best explained, and manifested, by reference again to FIG. 3 which depicts the effect upon the output waveform of R1 attributable to a perturbation of the surface wave traversing the display surface in the vicinity of area A1. This effect is manifested in the waveform as a dip D1 along the time axis which corresponds to the point where the operator touched the panel. The depth of the dip is indicative of the pressure that the operator applied during his touch. Let us assume that the point of touch occurred approximately one-fourth of the distance along the major axis of the display surface commencing from the left side, as viewed in FIG. 2. As previously noted, it was assumed that the time entailed for a surface wave to travel the length of grating G1 was 88 microseconds. One-fourth of that time would be 22 microseconds. Adding to that number the 64 microseconds required for the wave to traverse the paths parallel to the minor axis of the surface, the 22 microseconds entailed in traversing a corresponding portion of array G2, and finally adding the 4 microseconds (2+2) initial and terminal transit times, the detector output waveform would indicate that a perturbation of the wave burst transmitted by T1 and subsequently received by R1, occurred approximately 112 microseconds (2+2+64+22+22) after the transmitter T1 launched the surface wave under consideration. This 112 microsecond interval is analyzed by computer 22 which informs the controller 14 that a perturbation was detected by receiver R1 at a particular instant in the time domain.

Preferably, a short time after T1 launched a surface wave a burst is launched by transmitter T2 and reflected by gratings G3 and G4 to return the components of that wave to receiver R2. In the manner described above with reference to a perturbation detected by R1, the surface wave components now traversing a path $p_h$ parallel to the major axis of the display surface are detected by R2 which establishes, in like fashion, the occurrence and time when the aforementioned perturbation of the wave, manifested in FIG. 4 as dip D2, was experienced along the Y-axis. Again, the depth of D2 is indicative of touch pressure. Applying this time-related information to that developed relative to the other axis, the computer informs the controlled device of the coordinates of the perturbation (touching at A1) so that that device may deliver for display upon the CRT screen the particular graphics associated or assigned to the location at which the touching occurred.

It is recognized that simultaneous operations to identify both coordinates are possible, but the preferred mode of operation is to alternate between the two. The latter practice eliminates crosstalk problems and makes it possible to economize by switching certain circuit elements (e.g., a tuned amplifier) between coordinate identifying channels, instead of duplicating such elements.

In an embodiment successfully reduced to practice the above-described gratings G1–G4 were formed by resort to a silk-screening technique in which a frit (solder glass) material was deposited in the pattern depicted in FIG. 2. More particularly, the actual configuration and spacing of the grating element pattern was computer generated utilizing the finger-withdrawal method. Consider first a basic reflective linear array comprising a multiplicity of surface wave reflecting fingers (elements) of equal width, equally spaced and collectively disposed at 45 degrees to the longitudinal axis of the path they define. Desirably, the spacing, or pitch, between adjacent elements should be one wavelength of the frequency of the burst of acoustic waves launched by the transmitting transducer. An acoustic wave traversing such an array in which the reflecting fingers are uniformly spaced will experience an expontential attenuation of power with distance so that little, if any, acoustic wave energy is available for reflection at the terminus of the array. Moreover, a uniform array of the type adverted to results, of necessity, in exponentially decreasing power density with distance in the reflected acoustic wave components directed across the display surface. In other words, the power density of the initially reflected wave components will be significantly greater than that of subsequently reflected wave components. Desirably, the reflected wave components traversing the display surface should be characterized by a substantially constant power density, as graphically depicted in FIGS. 3 and 4, otherwise those plots would depict an exponentially decreasing amplitude.

The desired constant power density of the reflected waves is achieved, in an execution that has been reduced to practice, by a patterned deletion of a grating's reflective elements in which the percentage of deleted elements decreases gradually from the launch point to the terminus of the grating. This results in a progressively increasing coefficient of reflectivity culminating in the sought for constant power density.

A reflective grating tailored for the above-mentioned execution was designed from an initial array of approximately 300 equally spaced elements having a pitch (in the direction of wave propagation) of one wavelength of a four MHz acoustic wave. In practice, elements are selectively deleted to the end that the spacing between remaining adjacent elements in the grating is a multiple (in which "multiple" includes one) of the above-mentioned one wavelength. In the subject execution, array elements were selectively deleted in accordance with the following formula:

$$\rho = \sqrt{\frac{C-1}{C\exp\left(\frac{x}{L}\right)-1}}$$

In the above expression, p is equal to the density of elements at coordinate x, where x is the distance measured from the far end of the array back toward the launch end. When x equals zero, element density is unity, which is the case for a uniform array with no elements deleted. C and L are constants, the values of which are determined by recourse to experimental data and depend upon the material properties of the display panel and the reflective elements, the length, width and thickness of the reflective elements, etc. The resulting grating comprised an array of approximately 130 elements having a pattern determined by the above formula and in which individual elements were 0.7" long and 0.011" wide.

Having described a preferred grating construction that provides for touch position detection in Cartesian coordinates, it should be understood that CRT 10 may utilize an angular or other coordinate system, or a system characterized by a single coordinate axis.

The arrangement described serves to launch a burst of surface waves into a reflective array or grating from which is derived a plurality of burst components. The array redirects these components across the display surface. In a broader sense, 10 may be thought of as comprising surface acoustic wave scanning means including input surface wave transducer means coupled to the surface wave propagating substrate 18 for scanning the surface in the direction of the coordinate axis with a timed succession of surface wave bursts directed in substantially parallel paths across the surface transversely to the said coordinate axis. The plurality of paths are respectively associated with different positions along the coordinate axis of the display surface. As the touch position information is developed by timing the surface wave burst component which is perturbed, the starting time of each of the succession of surface wave bursts which are directed across the panel must be carefully controlled. As noted, timing is inherent in the propagation velocity of the surface wave burst as it travels through the reflective grating. Other CRT embodiments are contemplated wherein the launching of the bursts of surface waves or wave components along parallel paths across display surface 18 is determined by other than the natural propagation velocity of surface waves on surface 18. For example, in the embodiment wherein a reflective array such as is shown in FIG. 2 is used to launch the surface wave burst components across the panel, the reflective array may be formed on a separate strip composed of a material having a different wave propagation velocity, such as a different glass or a metal, which is adhered to display surface 18. Care must be taken to insure an efficient transition of the waves from the reflective grating onto the display surface, as by feathering the interfacing edge of the strip. The wave reflective array may be formed on a separate strip for other reasons also, such as ease or economy of manufacture.

In a broad sense, the inventive CRT 10 utilizes an absorption ranging system, quite unlike the above-discussed reflection-type ranging system shown in the prior art U.S. Pat. No. 3,653,031. In the present invention, the absence of wave energy or the presence of wave energy at a reduced level, as results when a finger, or a stylus reasonably capable of absorbing acoustic surface wave energy, damps the amplitude of a surface wave burst propagating through the region of the touch, is sensed and the timing of that information is utilized to determine which of the plurality of burst propagation paths has been perturbed, and thus the location of the touch. One will note that the time required for the surface wave burst components to propagate across the panel is constant for all burst paths. However, the time required for the surface wave burst launched by the input transducer to propagate to the point at which it is again redirected across the panel, and from the point at which it is redirected to the output transducer, varies along the coordinate axis along which the touch may occur. It is this varying distance, and the surface wave propagation time associated therewith, which are utilized to locate the position of a touch along the coordinate axis.

Unlike prior art systems which have a fixed number of emitters along one side of the touch panel and a corresponding fixed number of detectors along the opposed side thereof and which detect the position of a touch by determining which of the emitter-detector pairs have been triggered, the novel CRT arrangement here present is characterized by the formation of a continuous succession of surface wave bursts which sweep across the faceplate display surface to culminate in the development of analog output signals at R1 and R2.

The above described preferred embodiment (FIG. 2) is shown as having reflective gratings G1, G2, G3 and G4, the elements of which are non-uniformly spaced. As already noted, in a practical embodiment this is desirable since a grating whose elements are uniformly spaced would reflect uniformly and thus produce an exponential fall-off in radiated power along its length. That is to say, if for each unit of length along the fixed grating, a fixed percentage of the power incident thereupon is radiated sideways, a smaller residue of power remains. If the same fixed percentage of that power is radiated in the succeeding section, it can be seen that the power decreases in a geometrical progression.

Figure 3:
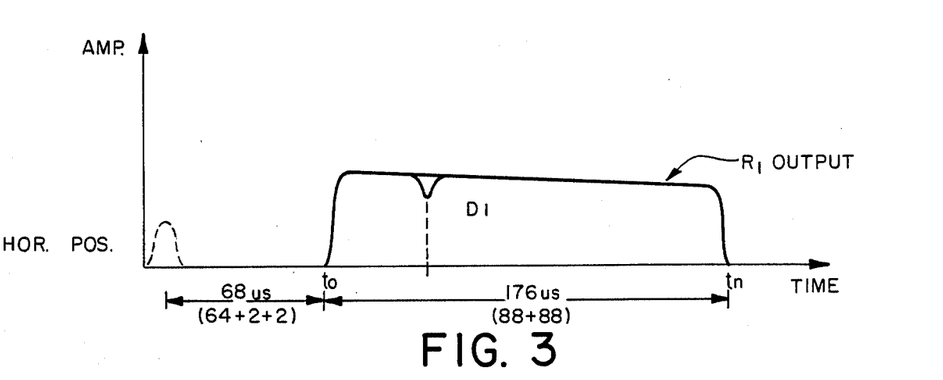
FIG. 3 is a graphical plot representative of received surface acoustic wave energy traversing one coordinate of the faceplate touch surface shown in FIG. 2.
Figure 4:
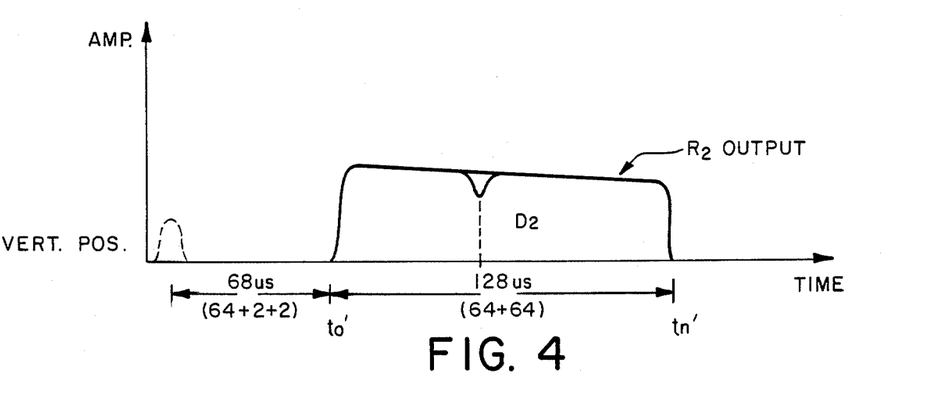
FIG. 4 is a graphical plot representative of received surface acoustic wave energy traversing a second, orthogonal, coordinate of the faceplate touch surface of FIG. 2.

By way of review, desirably, a flat response as is shown in FIGS. 3 and 4 is preferred. In accordance with a preferred execution, the reflectivity of the reflective elements constituting the reflective grating or gratings which adjoin the input transducer is weighted such that the initial elements have a relatively low reflectivity and the succeeding elements have increasing reflectivity. Stated in another way, the reflective array has an increasing coefficient of reflection in the direction away from the adjoining transducer so as to compensate for the fall-off in wave amplitude which results from the continuing diversion of wave energy into paths across the panel. It should be understood that the reflective array adjoining the input transducer should have increasing reflectivity in the direction of wave propagation, but for the array adjoining the output transducer, the array should have a corresponding decrease in reflectivity in the direction of wave propagation. Thus, in both cases, the reflectivity should increase in the direction away from the adjoining transducer. This desirable attribute is realizable in the FIG. 2 embodiment by virtue of the depicted non-uniform spacing of the reflective elements constituting each of gratings G1–G4.

For perfect uniformity of the transversely radiated surface wave power, and assuming no power loss by dissipation anywhere in the array, the power along the array must decrease linearly with distance. For this to occur, the power reflectivity must increase inversely with the distance remaining to the point beyond the array where the linearly decreasing power would drop to zero. (As used herein, reflectivity is the fraction of the longitudinally incident power diverted transversely per unit length.) In other words, power reflectivity K must increase with the distance x from the transducer in accordance with $$K = \frac{1}{G - x + \frac{1}{Ke}}$$

where Ke is the maximum reflectivity actually used at the far end where x=G, and the symbol G represents the length of the grating. Note that K and Ke have the dimension of a reciprocal length (fraction of power diversion per unit length).

There are a number of ways the reflectivity of the grating can be increased in the direction away from the adjoining transducer so as to flatten out the output waveform of the output transducer. One way would be to increase the thickness of the reflective elements in the direction away from the adjoining transducer, as the power reflectivity is proportional to the square of the thickness of the reflective elements. This could be done, in theory, by screen printing or etching (where grooves are used), however in practice this approach might prove to be difficult to execute.

Figure 5:
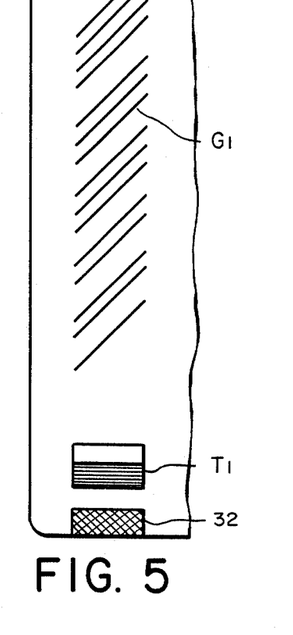
FIG. 5 is a schematic representative of a reflective array in which the pattern of elements results from "finger withdrawal"

A second, more practical, approach is to remove selected ones of the reflective elements in accordance with a formula which yields the desired increase in reflectivity along the array, see FIG. 5, also FIG. 2 and the earlier discussion concerning tailoring a reflective grating. For example, if one wished to cover a range of power reflectivity variation of 9 to 1 (an amplitude ratio of about 3 to 1), one would eliminate two of every three strips at the beginning of the array. Strips would be gradually added (fewer strips eliminated) along the length of the array until at the end of the array, no strips would be eliminated. This is a practical method and has been reduced to practice successfully.

Figure 6:
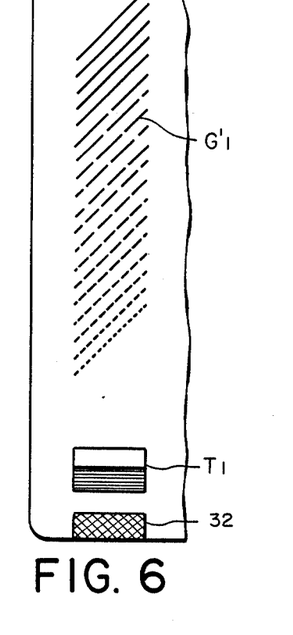
FIG. 6 is a schematic representation of a reflective array in which individual elements are fragmented in a patterned fashion.

Yet another method involves weighting the reflectivity of each of the individual reflective elements, as shown schematically in FIG. 6 by fragmenting individual elements of an array G'1. The elements have greater interruptions (which may be produced according to a random formula) at the end of the array nearest the transducer (input or output) than at the opposite end of the array.

Figure 7:
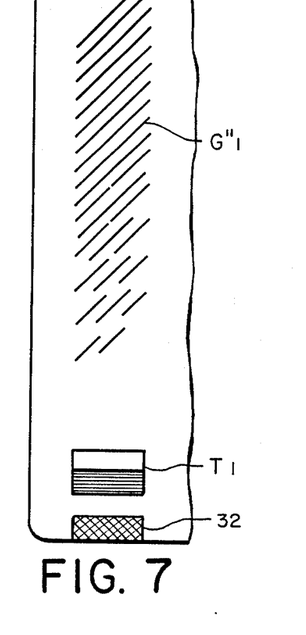
FIG. 7 is a schematic representation of a reflective array in which the length of individual elements increases in the direction away from the adjoining transducer.

In yet another embodiment (FIG. 7), the reflective array G''1 has array elements whose individual length increases in the direction away from the adjoining transducer and whose individual posit along the length of the element is varied within the side boundaries of the array. With all these methods, the reduction in element length ρ corresponds to an equal reduction in amplitude of the reflected burst, and the power reduction, above referred to as K/Ke, equals $\rho^2$.

The same technique can be used, that is, weighting the reflective elements according to a prescribed reflectivity shading formula, to compensate for energy dissipation in the reflective array or other factors for which compensation may be desirable. The equation previously mentioned in connection with the preferred embodiment allows for uniform dissipation.

Figure 8:
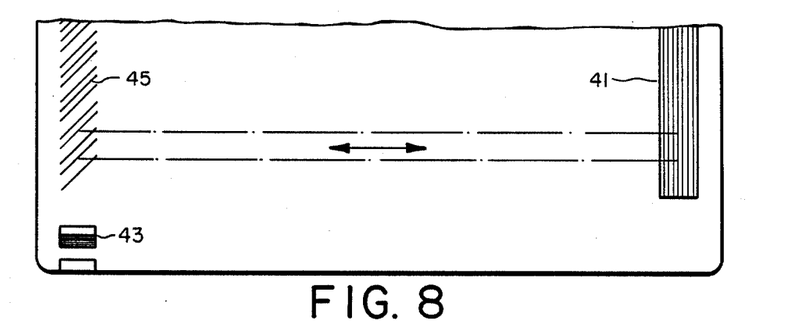
FIG. 8 is a schematic representation of a touch panel arrangement in which a single device is utilized as the input and output transducer.

Whereas the preferred CRT embodiment has been described as having separate input and output transducer means and means redirecting a burst of surface waves launched from an input transducer to a different output transducer, it is contemplated that the input transducer may also be the output transducer. See FIG. 8 wherein a reflector 41 is employed to reflect the waves launched by the common input/output transducer 43 back across the faceplate substrate where they are redirected by a grating 45 back to the input/output transducer 41. The reflector 41 may consist of a series of half-wavelength spaced reflecting elements—either raised or depressed grooves—as is well known in the surface wave art.

Figure 9:
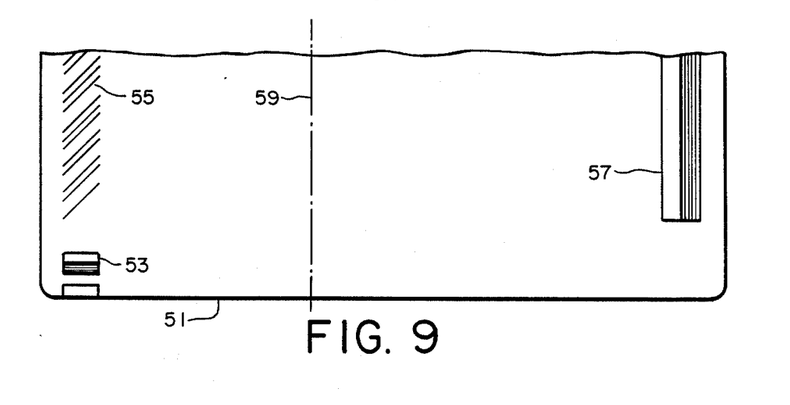
FIG. 9 is a schematic representation of a touch panel arrangement utilizing an output transducer coextensive with one coordinate of the panel.

FIG. 9 illustrates yet another embodiment of the invention comprising a CRT faceplate substrate 51 to which is coupled an input transducer 53 for launching a burst of surface waves on the surface of the substrate 51. Surface wave redirecting means includes a grating 55 of the character of the gratings described above for redirecting surface wave burst components derived therefrom across the surface of the substrate 51 to output transducer means 57 along a plurality of paths of different lengths which are respectively associated with different positions along a coordinate axis on the display surface.

The FIG. 9 embodiment differs from other embodiments described in that the output transducer means 57 extends in the direction of the coordinate axis 59 and is of such length as to intercept each of the plurality of burst component paths. Circuit means (not shown) may be provided for initiating surface wave bursts on the surface and for detecting touch-induced perturbations of received wave burst components. It will be understood that unlike the other embodiments described, the varying component of the transit time of each of the surface wave burst components will only be half that in the aforedescribed embodiments. In the aforedescribed embodiments the variable part of the transit time of the surface wave burst component had an outgoing component and a returning component, whereas in the FIG. 9 embodiment, the surface wave burst component transit time has only an outgoing component. It is, of course, understood that the functions of input and output transducer may be interchanged.

Figure 10:
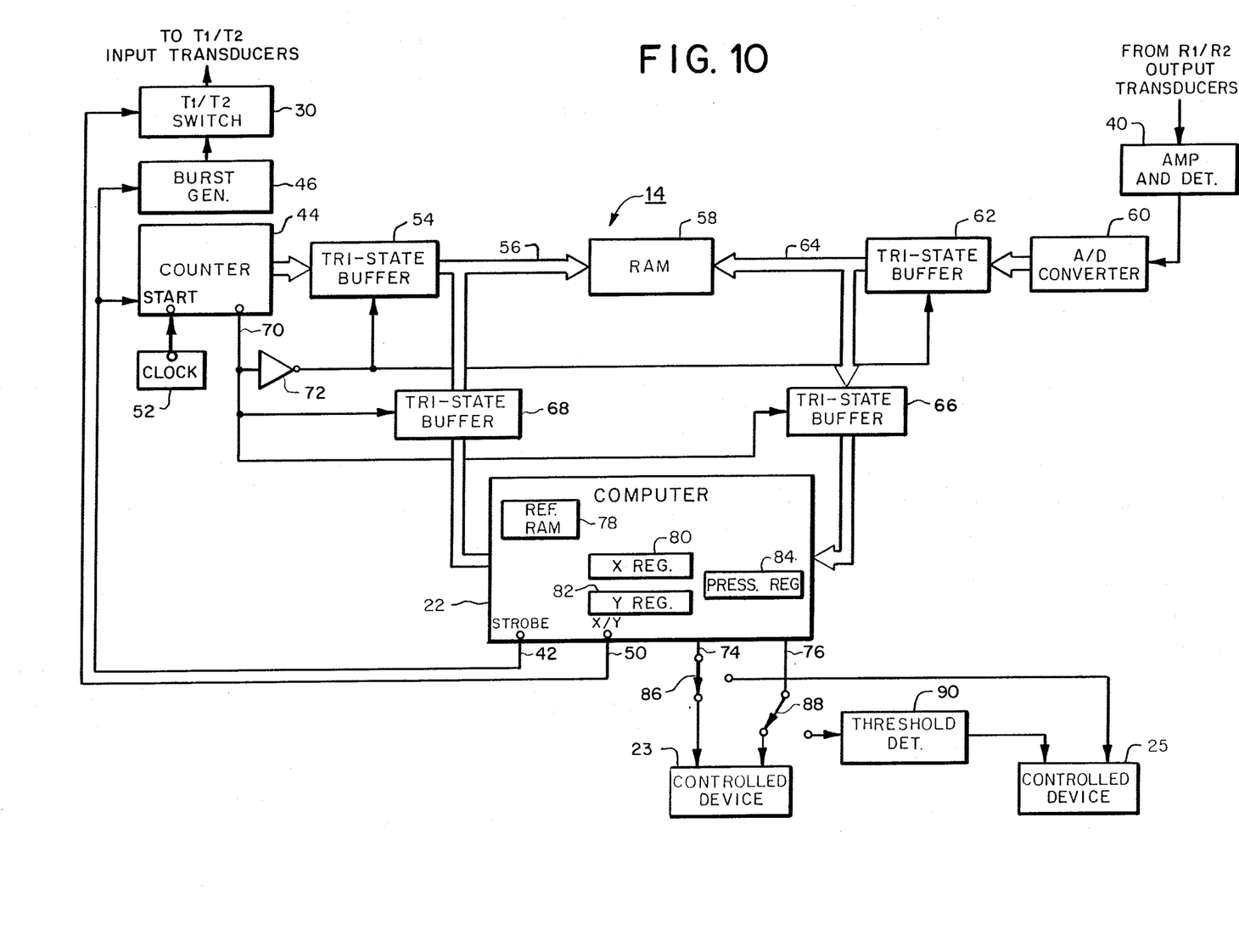
FIG. 10 is a block diagram of a touch panel control system for use with the cathode ray tube shown in FIG. 1.

The manner in which the controller 14 of FIG. 10 serves to generate and apply firing signals to substrate transducers T1 and T2 and, to analyze touch-perturbed surface wave components delivered by receiver transducers R1 and R2, will now be presented.

FIG. 10 comprises a block diagram of control system 14 which is connected between the input transducers T1, T2 and the output transducers R1 and R2. As will be explained in further detail hereinafter, control system 14 initiates the generation of properly timed surface acoustic waves across substrate surface 18 of the touch panel and processes the analog output signals S1, S2, produced in response thereto, graphically depicted in FIGS. 3 and 4, for deriving respective control signals containing information indicative of touch position and touch pressure.

More particularly, the control system 14 comprises the computer 22 having a strobe output terminal 42 connected to the start input of a counter 44 and to the input of a burst generator 46. In response to a strobe signal, which defines the beginning of a memory "write" cycle, burst generator 46 generates a high frequency burst (for example, 16 to 24 cycles at 4 MHz) which is coupled to a T1/T2 (X/Y) switch 30 for application to the T1 and T2 transducers. The state of switch 30 is controlled by a bit developed on an X/Y output 50 of computer 22 such that the burst is alternately coupled to the X and Y transducers (T1/T2) for producing surface acoustic waves across the touch panel in the X and Y (as they are conventionally designated) directions. The strobe signal also enables counter 44 which begins counting clock pulses generated by a block 52. The output of counter 44 comprises a sequence of address signals which are coupled by an enabled tri-state buffer 54 to an address bus 56 for application to the address input of a RAM 58. The amplitude modulated signal 53 or 54 developed by either the R1 or R2 output transducers in response to the high frequency burst is coupled by an amplifier and detector 40 to the input of an A/D converter 60. A/D converter 60 converts the analog input signal to a digital format, for example a six bit signal, the digital signal being coupled by a second enabled tri-state buffer 62 to a data bus 64 for application to the data input of RAM 58 as well as to the input of a third tri-state buffer 66 whose output is connected to the data input of computer 22. A fourth and final tri-state buffer 68 is coupled between an address output of computer 22 and data bus 56. 1 During a memory "write" cycle initiated by a strobe pulse on output 42 of computer 22, buffers 66 and 68 are both disabled inhibiting the application of data to computer 22 via buffer 66 and the application of address signals from computer 22 to address bus 56 via buffer 68. Thus, during the memory "write" cycle a plurality of digital samples, e.g., 320, of the X or Y analog output signal are written into RAM 58 in response to the address signals from counter 44.

After counter 44 completes a full counting cycle, (i.e., 320 clock pulses) it is internally held in its final counting state and an output 70 thereof transitions from a logically low to a logically high state. This transition defines the end of a memory "write" cycle and the beginning of a memory "read" cycle. In praticular, the logically high level on output 70 enables buffers 66 and 68 and is coupled through an inverter 72 for disabling previously enabled buffers 54 and 62. During the ensuing memory "read" cycle, address signals generated by computer 22 are therefore coupled through enabled buffer 68 to address bus 56 for reading the digital samples stored in RAM 58 onto data bus 64. The stored digital samples read onto data bus 64 are coupled through enabled buffer 66 to computer 22 which, as will be explained in further detail hereinafter, processes the data to develop two control signals on outputs 74 and 76 respectively representing the position and pressure of a touch on the touch panel substrate 18. After all of the samples stored in RAM 58 have been read into and processed by computer 22, another strobe pulse is developed on output 42 initiating a second memory "write" cycle, followed by another memory "read" cycle, and so on. It will be understood that the X/Y bit on output 50 toggles X/Y switch 30 during alternate memory "write" cycles so that surface waves are alternately generated in the X and Y directions.

In a preferred embodiment of the invention, the first two memory "write" cycles following power-up of computer 22 establish reference profiles of the analog output signal in both the X and Y directions against which subsequent outputs are compared to establish touch position and pressure. These reference profiles are stored in a reference RAM 78 of computer 22 during the memory "read" cycles following the first two memory "write" cycles.

During each subsequent memory "write" cycle, which is preferably accomplished at a relatively high speed (e.g., 4.0 Mega-writes/sec) 320 digital samples representing either the X or Y output signal are written into RAM 58. The samples are subsequently transferred to computer 22 at a much slower rate (e.g., 250 kilo-reads/sec) for processing. Computer 22 is programmed for comparing each sample as it is recieved from RAM 58 with the corresponding reference sample stored in reference RAM 78. Any positive difference between a reference sample stored in RAM 78 and the value of the corresponding sample being read from RAM 58 exceeding a predetermined noise threshold represents a touch on the substrate surface 18.

The position or location of the touch on the faceplate surface 18 is established in relation to the memory locations in RAM 78 at which the differences in the X and Y directions were detected. The pressure of the touch is established in relation to the magnitude of the differences. In particular, it has been found useful to average the differences in the X and Y directions to represent the touch pressure. This average difference may conveniently be derived by dividing the sum of the X and Y differences by a factor of two. The derived touch location or position information is stored in an X-register 80 and Y-register 82 and developed on output 74 while the derived touch pressure information is stored in a pressure-register 84 and developed on output 76.

For purposes of illustration, the touch position and pressure information provided on outputs 74 and 76 respectively of computer 22 are shown as being coupled through a pair of switches 86 and 88 to two controllable devices 23 and 25. With the switches in the positions shown in FIG. 10, both the position and pressure representative signals are applied to device 23. The signal on output 74 will thus provide touch position information to device 23 while the signal on output 76 will provide touch pressure information to device 23. Since the touch pressure information has a high degree of resolution, preferably comprising, for example, a six bit signal, it may be considered to be indicative of plural discrete non-zero levels of touch pressure, or a continuum of levels of touch pressure and thus effectively represent a continuously variable signal of the type useful for representing analog functions such as volume control and the like.

When switches 86 and 88 are switched to their other positions, touch position information is directly provided to another device 25 (which also can be a CRT of the type above described) while touch pressure information is coupled to the device through a threshold detector 90. Threshold detector 90 may, for example, be designed to provide an output to device 25 only when the pressure information on output 76 exceeds a selected threshold value. In this manner, an on/off type function of device 25 can be conveniently controlled in response to touch pressure. By way of example, in an application or embodiment wherein the system is configured as it appears when switches 86 and 88 couple the outputs on 74 and 76 to device 25, the system could be designed such that touch pressure above a predetermined noise threshold activities a display or indicator signalling the user that a certain function has been selected. Pressing harder on the faceplate surface causes a second threshold to be exceeded and the command to be "entered". As a second example, with the switches 86, 88 in the other position, an operative touch (above the noise threshold) might activate a display that depicts a particular device—pressing harder might then control the volume or output from that device.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective against the prior art.

What is claimed is:

1. A cathode ray tube for use in a touch panel display system capable of recognizing touch positions along a predetermined coordinate axis on a touch surface of said system, said tube comprising:
   a transparent glass faceplate having a touch surface capable of propagating surface acoustic waves and being so characterized that a touch on said surface causes a perturbation, in the form of at least a partial absorption of energy, of a surface wave propagating through the region of the touch;
   input surface wave transducer means mechanically and acoustically coupled to said touch surface of said faceplate and useful when excited for launching a burst of surface waves on said surface;
   at least one array of wave-reflective elements in or on said touch surface of said faceplate for directing surface wave components, derived from said burst of surface waves launched by said input transducer means, across said touch surface of said faceplate; and
   output surface wave transducer means also mechanically and acoustically coupled to said touch surface for receiving said surface wave components.

2. The cathode ray tube defined by claim 1 wherein said array has, in the direction away from said input transducer means, the reflectivity of the individual elements increasing.

3. The cathode ray tube defined by claim 1 wherein said array has elements whose individual length increases in said direction away from said input transducer means, and whose individual position in a direction along the length of the element is varied within the side boundaries of the array.

4. A cathode ray tube for use in a touch panel display system capable of recognizing touch positions along a predetermined coordinate axis on a touch display surface of said system, said tube comprising:
   a transparent flat glass faceplate having a touch display surface capable of propagating surface acoustic waves and being so characterized that a touch on said surface causes a perturbation, in the form of at least a partial absorption of energy, of a surface wave propagating through the region of the touch;
   input surface wave transducer means mechanically and acoustically coupled to said touch display surface of said faceplate surface and useful when excited for launching a burst of surface waves on said surface;
   output surface wave transducer means mechanically and acoustically coupled to said touch display surface of said faceplate for recieving surface waves derived from said burst of surface waves;
   surface wave redirecting means in or on said touch display surface for redirecting surface waves, derived from said input transducer, across said touch-display surface of said faceplate to said output transducer means along a plurality of paths of different lengths which are respectively associated with different positions along said coordinate axis on said touch-display surface.

5. A cathode ray tube for use in a touch panel display system capable of recognizing touch positions along a predetermined coordinate axis on a touch-display surface of said system, said tube comprising:
   a transparent flat glass faceplate having a touch-display surface capable of propagating surface acoustic waves and being so characterized that a touch on said surface causes a perturbation, in the form of at least a partial absorption of energy, of a surface wave propagating through the region of the touch;
   combined input-output surface wave transducer means mechanically and acoustically coupled to said touch-display surface and useful when excited for launching surface waves on said touch-display surface and for receiving surface waves returning to said combined transducer means;
   surface wave control means in or on said touch-display surface, including first means for redirecting surface waves, derived from said transducer means, across said touch display surface and reflective means for reflecting the waves back to said combined input-output transducer means along a plurality of paths of different lengths which are respectively associated with different positions along said coordinate axis on said touch-display surface.

6. The cathode ray tube defined by claim 5 wherein said reflective means includes an array of half-wave spaced grooves in said touch-display surface or an array of half-wave spaced deposits of wave-reflective material on said touch-display surface.

7. A cathode ray tube for use in a touch panel display system capable of recognizing touch positions along a predetermined coordinate axis on a touch display surface of said system, said tube comprising:
   a transparent flat glass faceplate having a touch display surface capable of propagating surface acoustic waves and being so characterized that a touch on said surface causes a perturbation, in the form of at least a partial absorption of energy, of a surface wave propagating through the region of the touch;
   input surface wave transducer means mechanically and acoustically coupled to said touch display surface of said faceplate and useful when excited for launching a burst of surface waves on said surface in a first direction parallel to said coordinate axis;

output surface wave transducer means mechanically and acoustically coupled to said touch display surface of said faceplate for receiving surface waves derived from said burst of surface waves;

a first reflective array of like-angled deposits of wave reflective material on said touch-display surface, or an array of like-angled grooves in said touch-display surface, for reflecting surface waves from said input transducer across said touch-display surface; and a second reflective array of like-angled deposits of wave reflective material on said touch display surface, or an array of like-angled grooves in said touch-display surface, for reflecting said surface waves reflected across said touch-display surface to said output transducer means in a second direction opposite to said first direction, said first and second reflective arrays causing said surface waves to traverse said touch-display surface substantially orthogonally to said coordinate axis along a progression of paths which are respectively associated with different positions along said coordinate axis on said touch-display surface, said first reflective array having an increasing reflectivity, and said second reflective array having a corresponding decreasing reflectivity, in the direction of wave propagation to at least partially compensate for the fall-off in reflected wave amplitude with increasing wave path length.

8. A cathode ray tube for use with a touch panel display system capable of recognizing touch positions along a predetermined coordinate axis on a touch display surface of said system, said tube comprising:

a transparent flat glass faceplate having a touch display surface capable of propagating surface acoustic waves and being so characterized that a touch on said surface causes a perturbation, in the form of at least a partial absorption of energy, of a surface wave propagating through the region of the touch;

input surface wave transducer means mechanically and acoustically coupled to said touch display surface of said faceplate and useful when excited for launching acoustic surface waves along a first path on said surface;

a first reflective grating comprising an array of reflective elements disposed along said first path, with said elements effectively arranged at like angles of incidence to the longitudinal axis of said first path, for extracting from said surface wave a multiplicity of wave components and for directing said wave components across said touch display surface of said faceplate along a like multiplicity of paths each disposed at an angle to said axis of said first path;

an output surface wave transducer means mechanically and acoustically coupled to said touch display surface of said faceplate at the terminus of a second path on said faceplate surface for receiving surface wave components derived from said burst of surface waves; and a second reflective grating comprising an array of reflective elements disposed along said second path and effectively arranged at like angles of incidence to the longitudinal axis of said second path for intercepting said wave components and for redirecting said intercepted wave components along said second path toward said output transducer means.

9. A cathode ray tube for use with a touch panel display system capable of recognizing touch positions along a predetermined coordinate axis on a touch display surface of said system, said tube comprising:

a trensparent flat glass faceplate having a touch display surface capable of propagating surface acoustic waves and being so characterized that a touch on said surface causes a perturbation, in the form of at least a partial absorption of energy, of a surface wave propagating through the region of the touch;

input surface wave transducer means mechanically and acoustically coupled to said touch display surface of said faceplate and useful when excited for launching acoustic surface waves along a first path on said surface;

a reflective grating comprising an array of reflective elements disposed along said first path, with said elements effectively arranged at like angles of incidence to the longitudinal axis of said first path, for extracting from said surface wave a multiplicity of wave components and for directing said wave components across said touch display surface of said faceplate along a like multiplicity of paths each disposed at an angle to said axis of said first path; and an output surface wave transducer means mechanically and acoustically coupled to said touch display surface of said faceplate along a second path on said faceplate surface disposed substantially parallel to said first path for intercepting said wave components.

10. A cathode ray tube of the type set forth in claim 8 in which said second path is disposed parallel to said first path.

11. A cathode ray tube of the type set forth in claim 8 in which said angles of incidence of said reflective elements to their respective paths are approximately 45 degrees.

12. A cathode ray tube of the type set forth in claim 8 in which said multiplicity of paths are disposed at approximately 90 degrees to said axis of said first path.

13. A cathode ray tube of the type set forth in claim 8 in which the configuration of said second reflective grating is a mirror image of the configuration of said first reflective grating.

14. A cathode ray tube of the type set forth in claim 8 in which the spacing between adjacent ones of said elements of said gratings is a multiple of one wavelength of the frequency of said acoustic surface waves.

* * * * *